(12) United States Patent
Zhu et al.

(10) Patent No.: US 10,977,841 B2
(45) Date of Patent: Apr. 13, 2021

(54) TIME-OF-FLIGHT (TOF) PET IMAGE RECONSTRUCTION USING LOCALLY MODIFIED TOF KERNELS

(71) Applicant: KONINKLIJKE PHILIPS N.V., Eindhoven (NL)

(72) Inventors: Yang-Ming Zhu, Solon, OH (US); Andriy Andreyev, Willoughby Hills, OH (US); Steven Michael Cochoff, Hudson, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 104 days.

(21) Appl. No.: 16/317,656

(22) PCT Filed: Jul. 20, 2017

(86) PCT No.: PCT/EP2017/068293
§ 371 (c)(1),
(2) Date: Jan. 14, 2019

(87) PCT Pub. No.: WO2018/024487
PCT Pub. Date: Feb. 8, 2018

(65) Prior Publication Data
US 2019/0287275 A1 Sep. 19, 2019

Related U.S. Application Data

(60) Provisional application No. 62/370,266, filed on Aug. 3, 2016.

(51) Int. Cl.
*G06T 11/00* (2006.01)
*G06K 9/32* (2006.01)
*G06T 7/00* (2017.01)

(52) U.S. Cl.
CPC ......... *G06T 11/006* (2013.01); *G06K 9/3233* (2013.01); *G06T 7/0012* (2013.01);
(Continued)

(58) Field of Classification Search
CPC ................. G06T 11/006; G06T 7/0012; G06T 2207/10081; G06K 9/3233
See application file for complete search history.

(56) References Cited

U.S. PATENT DOCUMENTS

| | | | |
|---|---|---|---|
| 7,897,926 B2 * | 3/2011 | Vandenberghe | A61B 6/037 250/363.04 |
| 9,606,245 B1 * | 3/2017 | Czarnecki | G01T 1/1642 |

(Continued)

OTHER PUBLICATIONS

Watson C C: "An Improved Weighting Kernel for Analytical Time-of-Flight PET Reconstruction", IEEE Transactions on Nuclear Science, IEEE Service Center, New York, NY, US, vol. 53, No. 5, Oct. 2008.

(Continued)

*Primary Examiner* — Santiago Garcia (57) ABSTRACT

An imaging device (1) includes a positron emission tomography (PET) scanner (10) including radiation detectors (12) and coincidence circuitry for detecting electron-positron annihilation events as 511 keV gamma ray pairs defining lines of response (LORs) with each event having a detection time difference Δt between the 511 keV gamma rays of the pair. At least one processor (30) is programmed to reconstruct a dataset comprising detected electron-positron annihilation events acquired for a region of interest by the PET scanner to form a reconstructed PET image wherein the reconstruction includes TOF localization of the events along respective LORs using a TOF kernel having a location parameter dependent on Δt and a TOF kernel width or shape that varies over the region of interest. A display device (34) is configured to display the reconstructed PET image.

20 Claims, 10 Drawing Sheets

(52) U.S. Cl.
CPC ............... *G06T 2207/10081* (2013.01); *G06T 2207/10088* (2013.01); *G06T 2207/10104* (2013.01); *G06T 2207/10132* (2013.01); *G06T 2211/416* (2013.01); *G06T 2211/421* (2013.01); *G06T 2211/424* (2013.01)

(56) References Cited

U.S. PATENT DOCUMENTS

| | | | |
|---|---|---|---|
| 2008/0175457 A1 | 7/2008 | Watson | |
| 2009/0124900 A1* | 5/2009 | Vandenberghe | A61B 6/037 600/436 |
| 2010/0074500 A1* | 3/2010 | Defrise | G06T 11/006 382/131 |
| 2015/0185339 A1* | 7/2015 | Lage | A61B 6/037 600/425 |
| 2015/0199302 A1* | 7/2015 | Qi | G06F 17/16 703/2 |
| 2016/0131774 A1* | 5/2016 | Lage | A61B 6/5258 600/426 |
| 2016/0370474 A1* | 12/2016 | Herraiz | A61B 6/4216 |
| 2019/0361136 A1* | 11/2019 | Song | A61B 6/037 |

OTHER PUBLICATIONS

Clementel, et al., "Effect of Local TOF Kernel Miscalibrations on Contrast-Noise in TOF PET", IEEE Transactions on Nuclear Science, vol. 60, No. 3, Jun. 2013.

* cited by examiner

TIME-OF-FLIGHT (TOF) PET IMAGE RECONSTRUCTION USING LOCALLY MODIFIED TOF KERNELS

CROSS REFERENCE TO RELATED APPLICATIONS

This application is the U.S. National Phase application under 35 U.S.C. § 371 of International Application No. PCT/EP2017/068293 filed Jul. 20, 2017, published as WO 2018/024487 on Feb. 8, 2018, which claims the benefit of U.S. Provisional Patent Application No. 62/370,266 filed Aug. 3, 2016. These applications are hereby incorporated by reference herein.

FIELD

The following relates generally to the medical imaging arts, positron emission tomography (PET) arts, image reconstruction arts, and the like.

BACKGROUND

Image reconstruction is a key component in the development and application of advanced positron-emission tomography (PET) imaging. Commercial time-of-flight (TOF) PET scanners have improved lesion detectability, reduced scan time or injected dose, and more accurate and precise lesion uptake measurement compared to non-TOF scanners. In TOF PET, the difference in the arrival times of the two photons is measured, which helps localize the event along the line of response (LOR). The uncertainty in this localization is determined by the system coincidence timing resolution. The most likely location of the event derived from such timing differences is assumed to follow a Gaussian distribution (or, more generally, a TOF kernel which may be Gaussian or some other distribution). The full width at half maximum (FWHM) of the TOF kernel is determined by the timing resolution of the detectors.

In principle, if the timing resolution is high enough, the location of the annihilation event can be precisely determined and there is no need for tomographic reconstruction. State of the art PET scanners currently offer 300 ps to 500 ps timing resolution that is associated with 90 mm to 150 mm event localization. Any improvement in the timing resolution is likely to provide a noticeable improvement in image quality, signal-to-noise ratio, or the like. Thus there is a desire to continue to reduce the timing resolution by employing higher-speed electronics in the PET detectors, which is an expensive endeavour.

The following discloses a new and improved systems and methods that address the above referenced issues, and others.

SUMMARY

In one disclosed aspect, an imaging device includes a PET scanner including radiation detectors and coincidence circuitry for detecting electron-positron annihilation events as 511 keV gamma ray pairs defining LORs with each event having a detection time difference $\Delta t$ between the 511 keV gamma rays of the pair. At least one processor is programmed to reconstruct a dataset comprising detected electron-positron annihilation events acquired for a region of interest by the PET scanner to form a reconstructed PET image wherein the reconstruction includes TOF localization of the events along respective LORs using a TOF kernel having a location parameter dependent on $\Delta t$ and a TOF kernel width or shape that varies over the region of interest. A display device is configured to display the reconstructed PET image.

In another disclosed aspect, a non-transitory computer readable medium carrying software to control at least one processor to perform an image acquisition method is provided. The method includes: acquiring, from a PET scanner including radiation detectors, PET emission imaging data including positron-emitting radiotracer distribution, the PET emission imaging data including electron-positron annihilation events as 511 keV gamma ray pairs defining LORs with each event having a detection time difference $\Delta t$ between the 511 keV gamma rays of the pair; generating, with at least one processor, a spatially variant TOF kernel by multiplying a standard TOF kernel by at least one input image; reconstructing, with the at least one processor, the PET imaging data to generate a reconstructed image using the spatially variant TOF kernel; and displaying, with a display device, the reconstructed image.

In another disclosed aspect, an imaging device includes a PET scanner including radiation detectors and coincidence circuitry for detecting electron-positron annihilation events as 511 keV gamma ray pairs defining LORs with each event having a detection time difference $\Delta t$ between the 511 keV gamma rays of the pair. At least one processor is programmed to reconstruct a dataset comprising LORs acquired for a region of interest by the PET scanner to form a reconstructed PET image wherein the reconstruction includes TOF localization of the event using a TOF kernel having a location parameter dependent on $\Delta t$ and a width parameter that varies with time of acquisition of the event. A display device is configured to display the reconstructed PET image.

One advantage resides in providing a TOF PET system with less stringent timing resolution requirements and improved effective timing resolution. For example, the reconstructed PET images with 600 ps timing resolution using a locally modified TOF (mTOF) kernel as disclosed herein can have comparable quality to the images with 300 ps timing resolution using the unmodified TOF kernel.

Another advantage resides in providing PET images reconstructed with the locally modified TOF kernel that have better quantitation than the images reconstructed with the unmodified TOF kernel.

Another advantage resides in reducing the TOF miscalibration errors.

Another advantage resides in providing systematic consideration of prior information on the images being reconstructed.

Another advantage resides in providing a locally modified TOF kernel that can be readily inserted into any image reconstruction algorithmic processing by replacing the TOF kernel calculation.

Another advantage resides in faster convergence of the iterative algorithm when using locally modified TOF kernel as compared to algorithm that uses unmodified TOF kernels.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the invention.

DETAILED DESCRIPTION

In TOF PET, timing resolution of the PET detectors is sufficient to measure, at least coarsely, the time difference $\Delta t$ between detection of the two 511 keV gamma rays of a coincident pair emitted by an electron-proton annihilation event. This time difference translates to a distance along the LOR toward the first-detected event (or, equivalently, away from the second-detected event) according to $\Delta d = c\Delta t$, where "c" is the speed of light. An event at isocenter has $\Delta t = 0$. In practice, the uncertainty as to the event time stamp means that there is uncertainty on $\Delta t$ and hence uncertainty on $\Delta d$. This uncertainty can be represented by a Gaussian localization curve (or, more generally, a TOF kernel which is a peaked distribution along the LOR) centered (i.e. having its mean) at the position $\Delta d$ calculated from the time stamp and having a variance corresponding to the time stamp uncertainty. Conventionally, the variance is set based on the detector speed and is constant for all TOF-localized LORs.

Figure 1A:
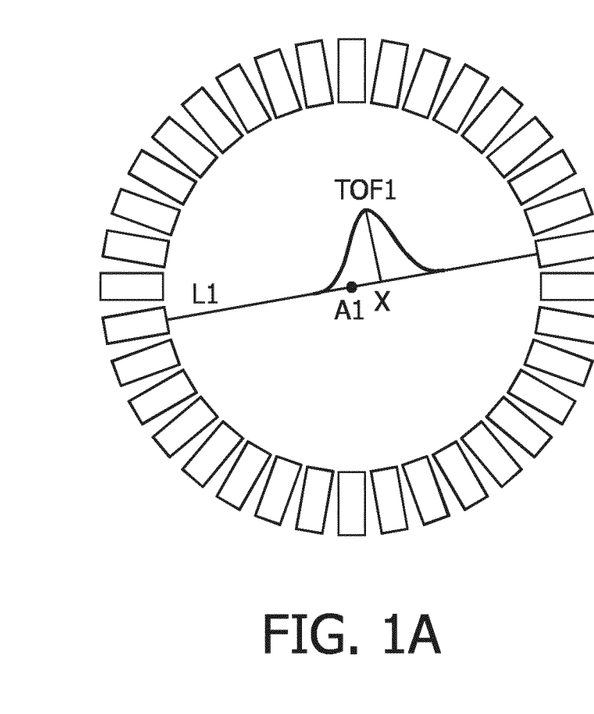
FIGS. 1A and 1B schematically show a demonstration of a TOF principle and certain drawbacks addressed by the present disclosure.
Figure 1B:
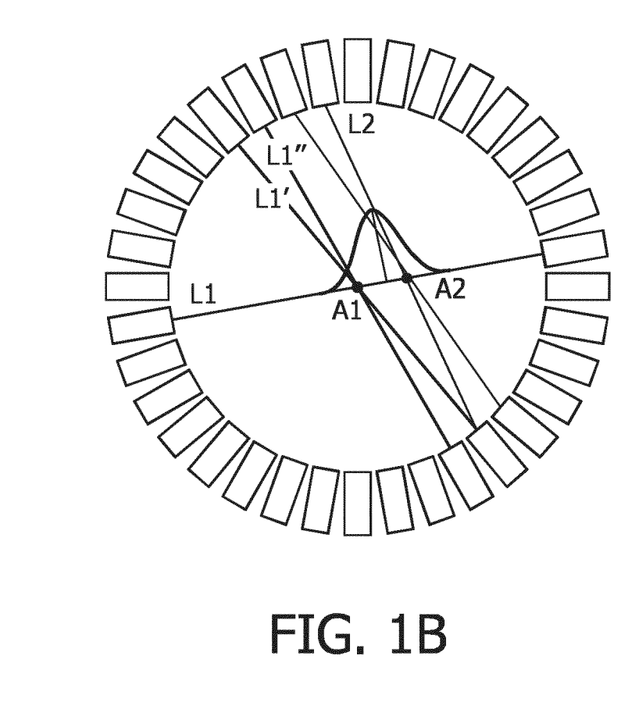

Another disadvantage of current TOF PET imaging is that the shape of the TOF kernel is the same for all events that are processed during the image reconstruction. The standard TOF kernel does not make use of any information one may have about the image being reconstructed. As the iterative reconstruction proceeds to convergence, confidence in the image contents improves, and the TOF kernel cannot and should not be fixed during the entire reconstruction process. In FIG. 1A, radiotracer annihilation event A1 is positioned along LOR L1 with measured time of arrival differences giving the most probable point of origin X. Due to the finite timing resolution in the detectors, during the reconstruction the most likely origin of the event is approximated by the Gaussian weighting function with the maximum located at X and the FWHM equal to the timing resolution of the scanner. Such an approach is not perfect and as shown in FIG. 1B, may lead to a certain bias. As can be seen in this simple example, there are two point sources A1 (having three LORs) and A2 (having only two LORs). The TOF1 kernel centred at location X due to finite timing resolution can bias the reconstructed image intensity towards location A2, although in reality, location A1 should appear brighter. Such a problem can be resolved with improved TOF resolution, however, at an added hardware cost and only to a certain limit.

The following recognizes that prior information may be used to improve the TOF localization on a per-event basis. This improved localization based on prior information is captured as a locally modified TOF kernel. The effect is to increase the effective TOF resolution of a given TOF PET scanner without costly investments in the detection hardware.

In some embodiments, if an estimate of the PET image is available, then this provides a basis for modifying the TOF kernel. Specifically, areas of higher radiopharmaceutical concentration are more likely to be the source for the electron-positron annihilation event compared with areas of lower radiopharmaceutical concentration. In this embodiment, the TOF kernel is modified by multiplying it by a PET image estimate along the LOR and re-normalizing. The PET image estimate can be from various sources. In some embodiments, an iterative PET reconstruction is assumed and the PET image estimate used to modify the TOF kernel in a current iteration is the PET image estimate generated by the immediately preceding iteration. If the initial "image" is a uniform image (typical starting point for most iterative image reconstruction algorithms), then there is no modification to TOF kernels initially.

In other embodiments, the PET image estimate may be an image generated by setting each event's TOF kernel FWHM to zero (so that each detected TOF event translates to a single point in space), or an image quickly generated by a coarse reconstruction. In another approach, a CT image is used as the PET image estimate, while the CT measures x-ray absorption rather than radiopharmaceutical concentration, it suffices to identify areas outside of the patient for which the radiopharmaceutical concentration is essentially zero, and the CT image could be segmented with various regions assigned expected radiopharmaceutical concentration values.

The approach has significant advantages in terms of more rapid iterative reconstruction convergence and improved image quality. Phantom studies described herein suggest that the effective time resolution is nearly halved using the disclosed approach (e.g., from 600 ps down to 300 ps).

Figure 2:
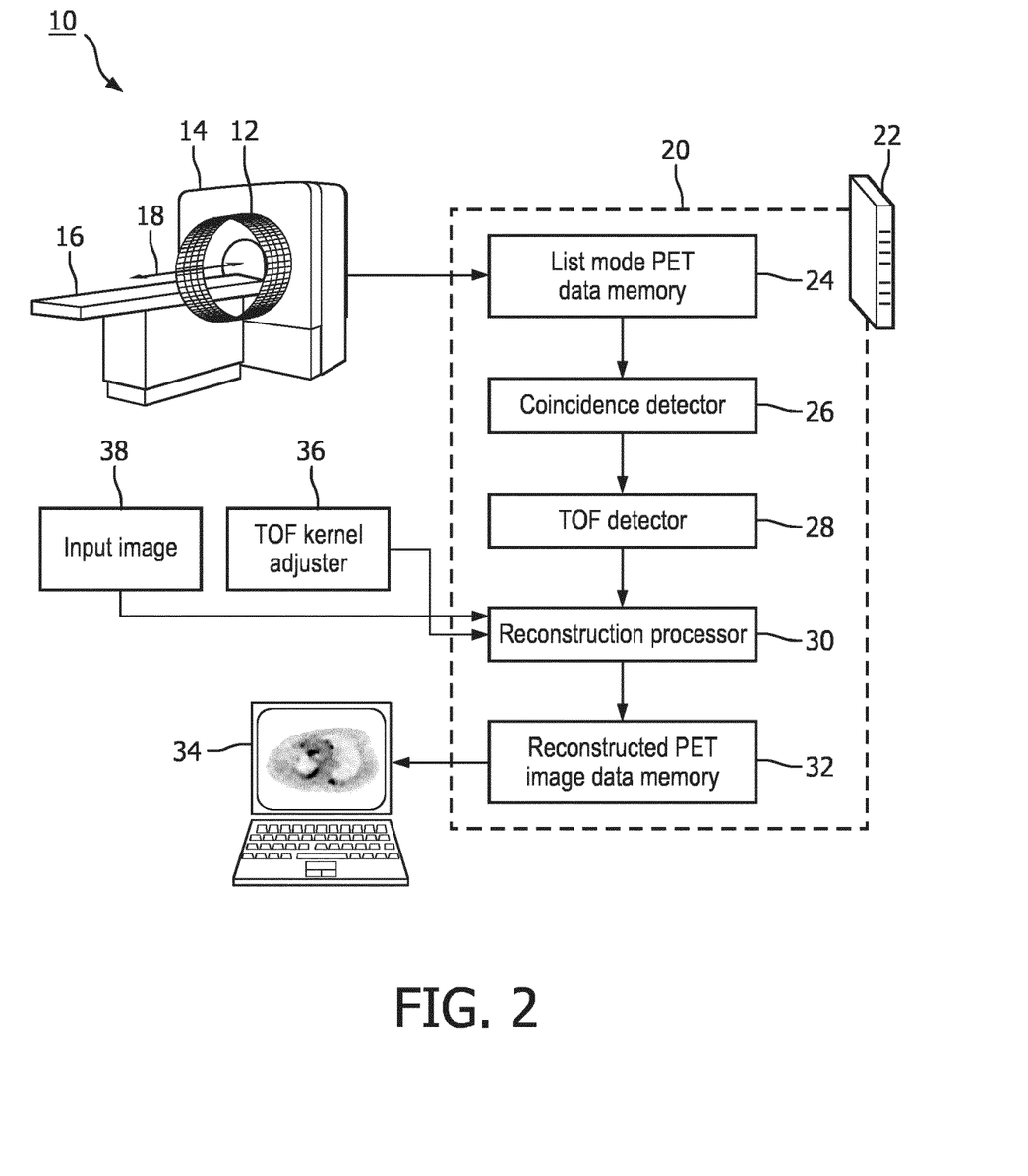
FIG. 2 diagrammatically shows a positron emission tomography (PET) imaging system.

With reference to FIG. 2, a positron emission tomography (PET) imaging device 1 includes a PET scanner 10 including one or more annular rings of PET radiation detectors 12 (or simply, PET detectors) mounted in a suitable housing 14, with a patient support 16 arranged to move a patient along an axial direction 18 oriented generally transverse to the plane of the rings 12. Note that while diagrammatic FIG. 2 shows the PET detector ring(s) 12 in the housing 14, more typically the housing is opaque and would occlude the PET detectors from view. Further, while the illustrative PET scanner 10 is a standalone device, PET reconstruction algorithms disclosed herein are equally applicable to hybrid imaging systems with a PET component, such as a computed tomography (CT)/PET scanner, an ultrasound (US)/PET scanner, or a magnetic resonance (MR)/PET scanner. (In some such embodiments, the use of a hybrid CT/PET, US/PET, or MR/PET scanner provides the PET image estimate for adjusting the TOF kernels in the form of a spatially registered CT, US, or MR image).

When used for medical imaging, a radiopharmaceutical is administered to a human imaging subject, and the subject is disposed on the support 16 and moved into the PET rings 12. The radiopharmaceutical includes radioisotopes that produce positrons during radioactive decay events, and each positron annihilates with an electron in an electron-positron annihilation event that outputs two oppositely directed 511 keV gamma rays. PET imaging data are acquired by the PET detectors 12 in the form of gamma ray detection event, which may be stored in a list mode format in which each event is time stamped.

In illustrative FIG. 2, an electronic data processing device 20 stores and processes the PET data to generate a reconstructed image. The illustrative electronic data processing device 20 is a computer 22, e.g. a server computer, desktop computer, a cloud computing resource, or the like. The list mode data are stored in a list mode PET data memory 24 (e.g. hard drive, RAID disk, solid state drive, et cetera) which is a component of, or accessible by, the device 20. The processor 20 performs coincidence detection with a coincidence detector 26 on the list mode data to detect 511 keV gamma ray pairs within a time window along lines of response (LORs), with each event having a detection time difference $\Delta t$ detected by a TOF detector 28 between the 511 keV gamma rays of the pair. The list mode data are also preferably filtered to remove events outside of an energy window about 511 keV (energy filtering). The resulting data are referred to herein as TOF-PET data, and comprise events each having TOF localization defined by the time difference $\Delta t$ or an equivalent thereof. A reconstruction processor 30 processes the TOF-PET data to generate a reconstructed PET image that is stored in an image data memory 32 (e.g. hard drive, RAID disk, solid state drive, et cetera) which is a component of, or accessible by, the device 20. Various suitable reconstruction algorithms may be executed by the reconstruction processor 30. In illustrative embodiments herein, maximum likelihood expectation maximization (MLEM) is used as an iterative image reconstruction algorithm. Other iterative reconstruction algorithms could be used, such as ordered subset expectation maximization (OSEM). A non-iterative reconstruction algorithm such as filtered backprojection is also contemplated. The reconstructed image may be displayed on a display device 34, e.g. a computer LCD display component of a workstation, desktop computer, tablet, notebook computer, or the like.

During the image reconstruction of the TOF-PET data, the time of flight localization along the LOR is captured using a TOF kernel, which is a peaked (and preferably normalized) distribution along the event's LOR having its peak at the location indicated by $\Delta t$ (i.e. shifted away from the center of the LOR by an amount $\Delta d = c\Delta t$ where "c" is the speed of light and $\Delta t$ and $\Delta d$ are signed quantities). In typical TOF-PET reconstruction, the TOF kernel is a Gaussian distribution, but other peaked distributions are also contemplated. The width of the TOF kernel (e.g. represented by a full-width-at-half-maximum or FWHM, or more particularly by the variance or standard deviation in the case of a Gaussian TOF kernel) captures the uncertainty in the TOF localization. A principal source of TOF localization uncertainty is the time resolution of the PET detectors, and conventionally the TOF kernel width is set uniformly for all LORs based on temporal resolution of the PET detectors.

As disclosed herein, substantially improved image reconstruction can be attained by replacing this conventionally uniform value for the width parameter of the TOF kernel with a width parameter whose value varies over the region of interest imaged by the TOF-PET imaging data. To this end, a TOF kernel adjuster 36 adjusts the TOF kernel width or shape based on spatial location, e.g. based on the spatial location of the peak of the TOF kernel for a particular LOR. In some embodiments, the TOF kernel adjuster 36 makes the adjustment on the basis of an input image 38 that is expected to provide a (possibly rough) estimate of the radiopharmaceutical concentration in the region of interest. This approach is based on the rationale that areas of higher radiopharmaceutical concentration are more likely to be the source of the electron-positron annihilation as compared with areas of lower radiopharmaceutical concentration.

In the following, some illustrative embodiments of reconstruction algorithms that may be implemented by the reconstruction processor 30 are described. In one embodiment, the reconstruction processor 30 is programmed to reconstruct a dataset comprising events acquired for a region of interest by the PET scanner to form a reconstructed PET image. As used herein, the term "region of interest" (and variants thereof) refers to a volume or area (e.g. slice) that includes a tumor, a lesion, or other tissue of the subject, or some other object to be imaged, from which the PET scanner 10 collects imaging data.

In some examples, the reconstruction performed by the reconstruction processor 30 includes TOF localization of the LORs using a TOF kernel (not shown in FIG. 2) having a location parameter (i.e., a height) dependent on $\Delta t$ and a width or shape that varies over the region of interest. For example, the TOF kernel may be a Gaussian distribution and the width parameter is the variance of the Gaussian distribution, although another peaked distribution may be used in place of the illustrative Gaussian distribution.

Figure 3:
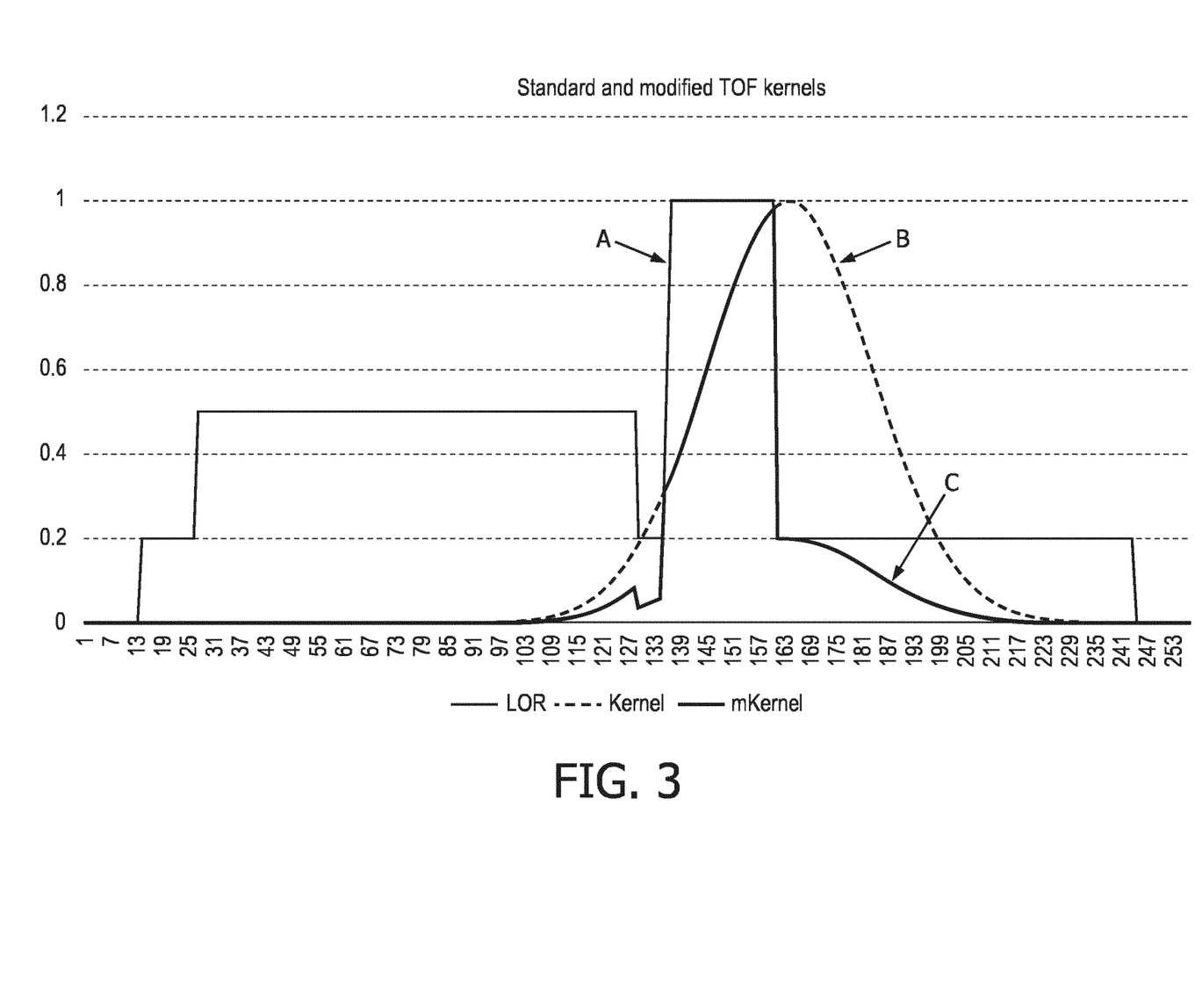
FIG. 3 graphically shows an example of standard TOF kernel and a locally modified (according to local emission density estimate) TOF kernel normalized such that the area under the kernel curve is 1.

FIG. 3 shows an example of a Gaussian TOF kernel. The curve labeled "A" is a profile through an input image of radiotracer emission distribution estimate (normalized) along the LOR or intersected by the LOR where the event is detected. The input image is the image used to adjust the TOF kernel width or shape (in the example of FIG. 3 the shape is to be adjusted). The curved labeled "B" is the standard TOF kernel, which is a Gaussian distribution in this example. The curve labeled "C" is the locally modified (adjusted) TOF (mTOF) kernel obtained by multiplying the standard TOF kernel (curve B) by the input image sampled along the LOR (curve A). Mathematically, this can be expressed as computing the shape of the mTOF kernel for a LOR j as proportional to $H_{ij}^{mTOF} = H_{ij}^{TOF} \cdot f_i$ where $H_{ij}^{TOF}$ is the system matrix of the reconstruction algorithm incorporating the value of a standard TOF kernel at location i along LOR j and $f_i$ is the value of the at least one input image at the location i. If a weaker (i.e. more relaxed) adjustment is desired, this can be expressed as $H_{ij}^{mTOF} = H_{ij}^{TOF} \cdot (1-b) + H_{ij}^{TOF} \cdot f_i \cdot b$ where b is an adjustment weighting parameter, wherein $0 \le b \le 1$. (The limiting case where b=0 reverts to the standard unmodified TOF kernel $H_{ij}^{TOF}$).

As shown in FIG. 3, the measured (i.e., nominal) position of the detected event along curve "A" is slightly to the right of the tall peak in the image along the LOR. Curve "B" corresponds to 300 ps timing resolution, with a maximum value normalized to 1. If there is no other information, curve "B" (i.e., the standard TOF kernel) assumes that the position where the event occurs follows the Gaussian distribution. Since the image content along the LOR is known, and there is higher activity to the left of the measured position and lower activity to the right, the event is estimated to have a greater chance of originating from the higher activity region, as represented by curve "C". When applied in the reconstruction, the areas of curves B and C are each normalized to 1, curve C (i.e., the locally modified TOF kernel) has higher values to the left and lower values to the right, when compared to curve B (i.e., the standard TOF kernel).

Figure 4:
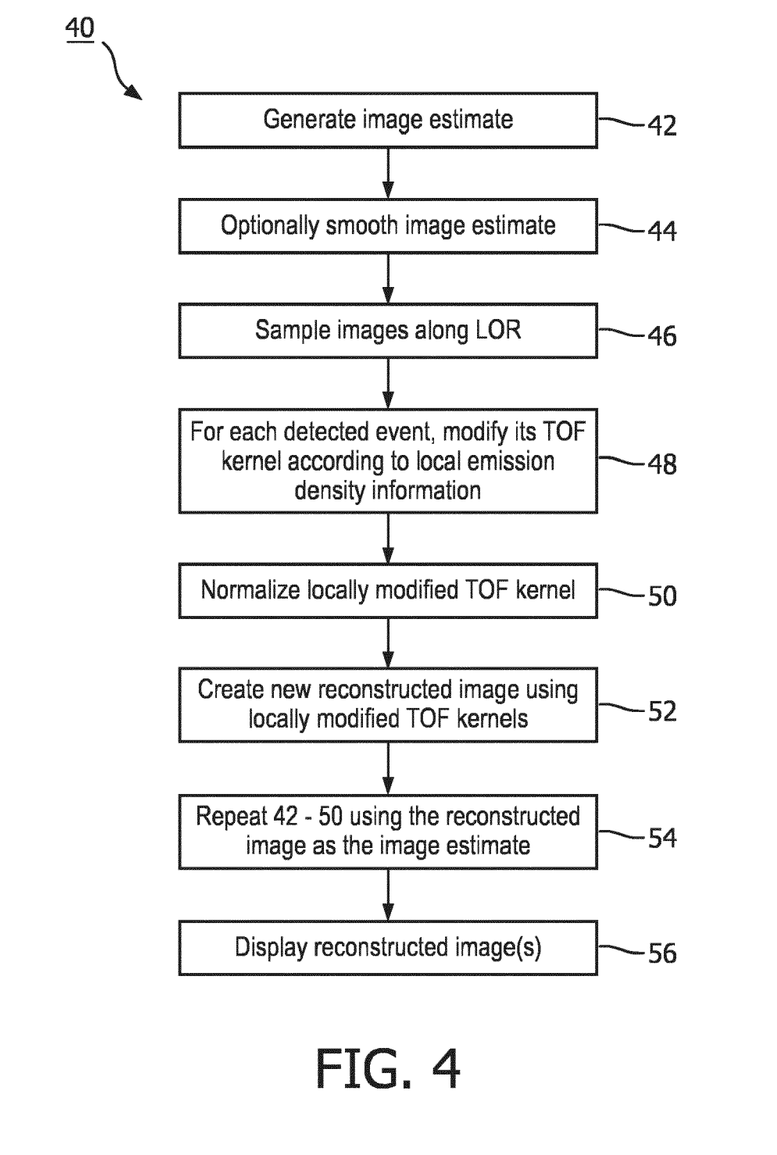
FIG. 4 shows an exemplary flow chart of an example operation of the PET imaging system of FIG. 2.

FIG. 4 shows an exemplary flow chart of a method 40 of the operations of the reconstruction processor 30. The method 40 includes: generating an image estimate 42; optionally smoothing the sampled images 44; sampling one or more images of the region of interest along the LOR of the event 46; computing a spatial variation of a standard TOF kernel over the region of interest using at least one image estimate to obtain a locally modified TOF kernel 48; normalizing the locally modified TOF kernel 50; using the normalized locally modified TOF kernel in a TOF reconstruction algorithm to create a reconstructed image 52; repeating 42-50 using the reconstructed image as the image estimate 54; and displaying the reconstructed image 56.

At 42, an image estimate is generated. For example, one or more input images can be the image estimate.

At step 44, the sampled images are optionally smoothed and/or normalized. For example, the images are smoothed using any suitable edge-preserving algorithm, or any suitable filter (e.g., a median filter). In some instances, the input image can be pre-processed in other ways as well. The smoothing filters and/or algorithms can be executed using the reconstruction processor 30.

At step 46, an input image of the region of interest, which is to be used in locally adjusting the TOF kernels, is sampled along each event's LOR of the TOF-PET dataset received or acquired by the reconstruction processor 30 from the PET scanner 10. These sampled images can be called a "prior image" or an "input image." The input image can be obtained in a variety of ways. For example, the input image could be a previously-generated reconstructed image. In this example, an iterative image reconstruction operation is performed. In the initial iteration, the standard TOF kernel may be used to reconstruct the first image, and in latter iterations the locally modified TOF kernel can be used to reconstruct subsequent images, where the local TOF modification uses a reconstructed image estimate from a previous iteration as the input image for locally adjusting the TOF kernels, e.g. as described with reference to FIG. 3. It will be appreciated that the modified TOF kernels can be updated at every iteration, e.g. using the reconstructed image estimate generated in the immediately preceding iteration.

In other examples, the input image for use in locally adjusting the TOF kernel can be generated using a fast algorithm, such as an analytical algorithm e.g., such as three-dimensional Fourier ReProjection (3D-FRP), Filtered Back-Projection (FBP), and the like, or another iterative algorithm (e.g., Row-Action Maximum-Likelihood Algorithm (RAMLA)), and the like. In further examples, the input image can be generated from the TOF-PET dataset by treating each event as if the timing resolution were perfectly 0, or equivalently, the TOF kernel as a Dirac's delta function (i.e., using most probable locations based on purely $\Delta d=c\Delta t$ offset). In yet further examples, the input image can be generated using images created from previous studies, but modified (i.e., warped) to the current image space. In yet other examples, the input image can be generated using a simulated PET image based on a CT image in the same PET/CT study session. It will be appreciated that any other suitable mechanism of generating input images may be used.

At step 48, a spatial variation of the TOF kernel over the region of interest is computed using the smoothed image to obtain a locally modified TOF kernel. In some embodiments, the reconstruction processor 30 is programmed to compute the spatial variation of the width or shape of the TOF kernel over the region of interest using at the least one input image. For example, the reconstruction processor 30 is programmed to compute the spatial variation of the shape of the TOF kernel for each LOR using the input image. To do so, the reconstruction processor 30 is programmed to multiply the TOF kernel along the LOR by the input image. This multiplication of the TOF kernel by the input image produces the locally modified TOF kernel shape.

At step 50, the locally modified TOF kernel is normalized.

At step 52, the normalized locally modified TOF kernel is used in a TOF reconstruction algorithm to create a reconstructed image. Stated another way, the PET imaging data is reconstructed by the reconstruction processor 30 to generate a reconstructed image using the spatially variant TOF kernel. For example, reconstruction of the image using the iterative maximum-likelihood expectation-maximization (MLEM) algorithm employs, for each iteration, the following update from the image f(n) at iteration n to image f(n+1) at iteration n+1:

$$f_i(n+1) = \frac{f_i(n)}{s_i} * \sum_{j \in f_i} H_{ij}^{mTOF}(n) * \frac{g_j}{\sum_{i \in g_j} H_{ji}^{mTOF} * f_i(n) + Corr_j}$$

where the summation over $j \in f_i$ indicates summation over all LORs $g_j$ that contribute to (i.e. intersect) the image voxel $f_i$. The foregoing iteration update is similar to conventional MLEM but replaces the conventional spatially invariant TOF kernel incorporated in the system matrix $H_{ij}^{TOF}$, $H_{ji}^{TOF}$ with an adjusted locally modified TOF kernel given by $H_{ij}^{mTOF}(n)=H_{ij}^{TOF}*f_i(n)$. Here, $f_i(n)$ is the input image which in this case is the reconstructed PET image estimate from the immediately preceding iteration n. Alternatively, if it is desired to apply a less aggressive local modification, a relaxed adjustment can be implemented as $H_{ij}^{mTOF}(n)=H_{ij}^{TOF}(1-b)+H_{ij}^{TOF}*f_i(n)*b$ as the modified forward- and backprojection TOF operator along LOR j. The parameter b is a weighting parameter in the range $0 \leq b \leq 1$. In addition, $Corr_j$ is an optional data correction factor; $s_i$ is the sensitivity matrix; $g_j$ is a measured LOR indexed by j; and $f_i(n)$ is the scalar value of the input image at voxel i at iteration n. It will be appreciated that this implementation merely entails replacing the standard (spatially invariant) TOF kernel in $H_{ij}^{TOF}$ with the adjusted (spatially modified) TOF kernel in $H_{ij}^{mTOF}(n)$ in the iterative MLEM update.

At the first iteration, the $H_{ij}^{mTOF}(0)$ is simply equal to standard spatially invariant (e.g. based on measured time resolution of the PET detectors) $H^{TOF}$, since expectation-maximization algorithms typically start from the uniform image estimate f(0)=1. The contents or structures of the adjusted TOF kernels $H^{mTOF}$ can take into account the nominal TOF resolution of the PET scanner 10, the spatial resolution of the PET scanner, the noise level of the input image, and the like.

At step 54, 42-52 are repeated using the reconstructed image (generated at 52) as the image estimate (at 42). In this embodiment, the reconstruction is an iterative reconstruction and the adjusting is performed for an iteration of the iterative reconstruction using a reconstructed image from a previous iteration as the at least one input image At 56, the reconstructed image(s) is/are displayed on the display 34. In this manner, a medical professional (e.g., a doctor, a nurse, a technician, and the like) can visualize the reconstructed image (s).

In some embodiments, the list-mode events are converted into sinograms before the image reconstruction (i.e., directionally alike events are grouped and averaged into sinogram bins with an added binning dimension to hold TOF information). The image reconstruction from sinogram is typically faster, as there is no need to process each list-mode event individually. Advantageously, the proposed TOF kernel modification can be also applied to the TOF bin of the sinogram, with the aim of correcting for the loss of TOF resolution associated with TOF sinogram rebinning.

Although the method 40 is described in regards to spatially-varying the width parameter of the standardized TOF kernel to produce a locally modified TOF kernel, it will be appreciated that other embodiments are contemplated. For example, the TOF kernel can be adjusted over time, rather than spatially. In one embodiment, the width parameter can be varied with a temperature change of the PET radiation detectors 12 over time. This temperature change translates to a change in time resolution which can be captured by adjusting the variance of the Gaussian TOF kernel appropriately.

Simulation Results

Figure 5:
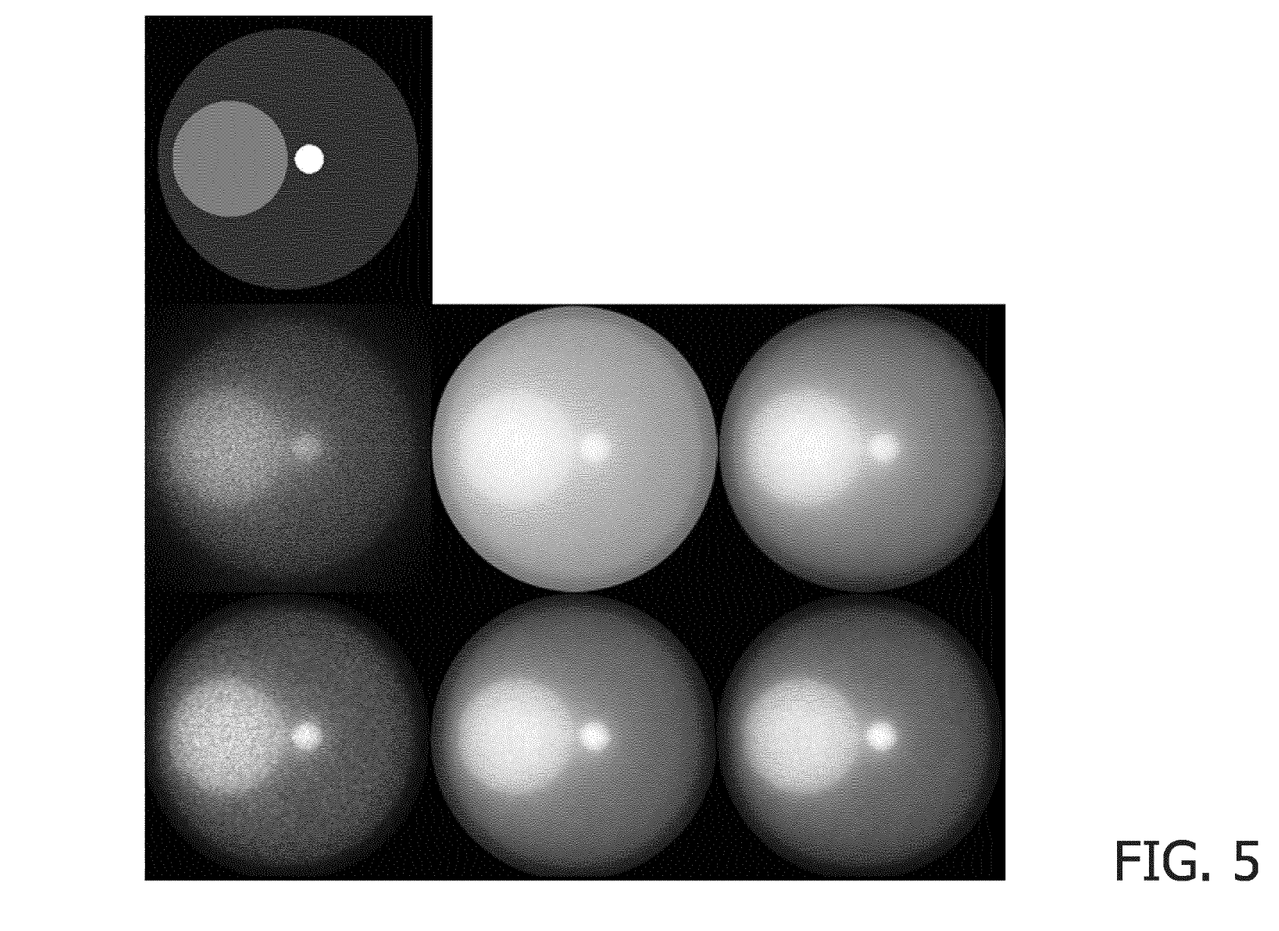
FIGS. 5-10 present simulation and experimental results as described herein.

As shown in FIG. 5, a simulation in 2D was performed. All images are of size 256×256 and the pixel has a dimension of 2×2 mm². To judge the image quality, the mean absolute error (MAE) was used between the reconstructed image and the ideal (true) image, where the ideal image is the scaled phantom (scaled by the total counts). As shown in FIG. 5, a phantom image is shown on the top row, with a timing resolution assumed to be 600 ps. The middle row shows the input images, from left to right: (left) created using the delta-function-shaped TOF kernel—most probable locations (i.e. assume the origin of each event to be offset by $\Delta d = c\Delta t$ from its LOR midpoint), (middle) created using simple back projection, (right) created using the TOF-based back projection. The bottom row shows the images reconstructed using the locally modified TOF kernel, using the images in the middle row as the input images. The improvement of image quality is apparent when comparing the middle and bottom rows.

Figure 6:
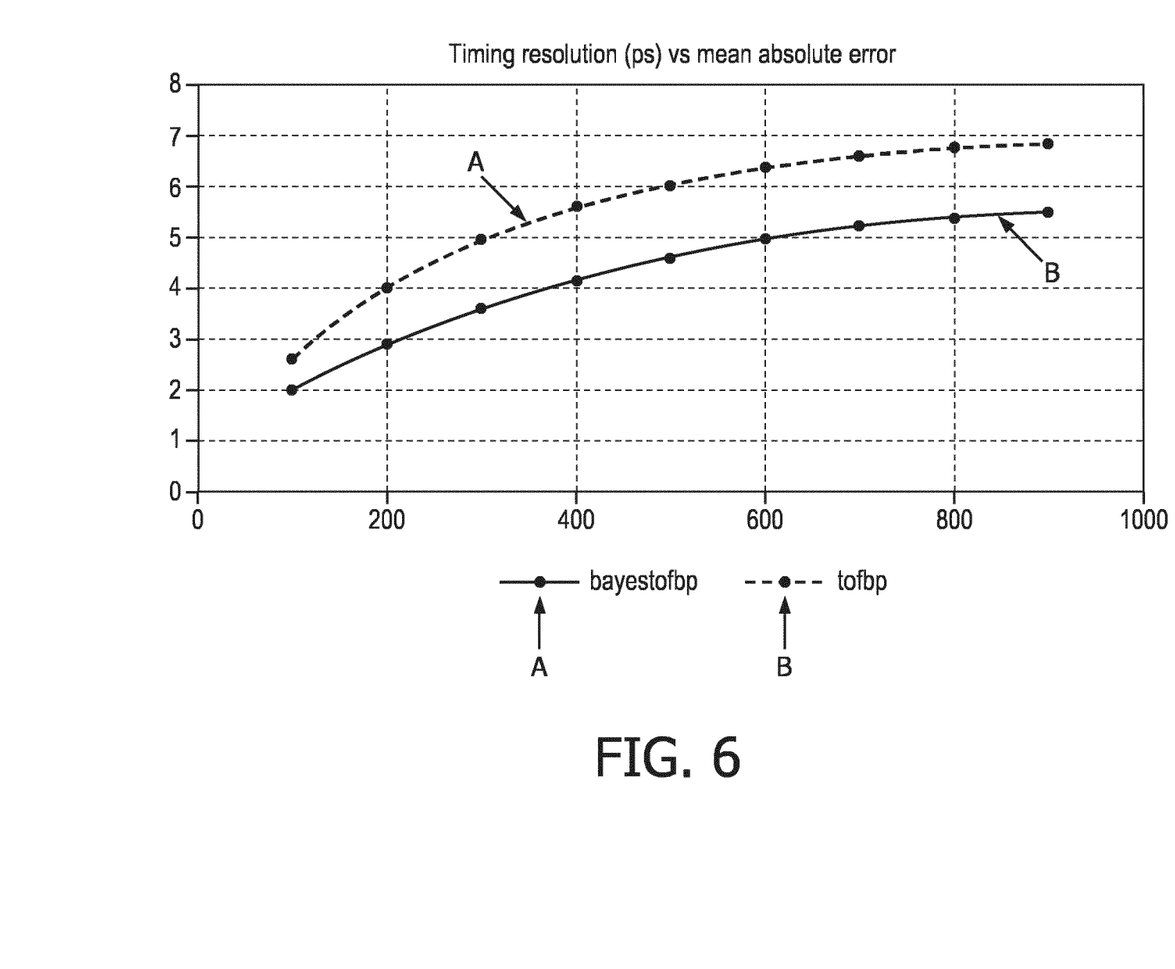

As shown in FIG. 6, the mean absolute error (MAE) is estimated as a function of timing resolution for two options: images are reconstructed using standard TOF kernels in back projection (tofbp) (labeled as "A" in FIG. 6) and images are reconstructed using locally modified TOF kernels and tofbp as prior images (bayestofbp) (labeled as "B" in FIG. 6). As shown in FIG. 6, the MAE for the locally modified TOF kernels at a resolution of 600 ps is about the same as the images reconstructed using the standard TOF kernels at a resolution of 300 ps. The similar relation also holds for resolutions of 400 vs 200 ps, which suggests that the locally modified TOF kernels have a less stringent requirement on the timing resolution.

Figure 7:
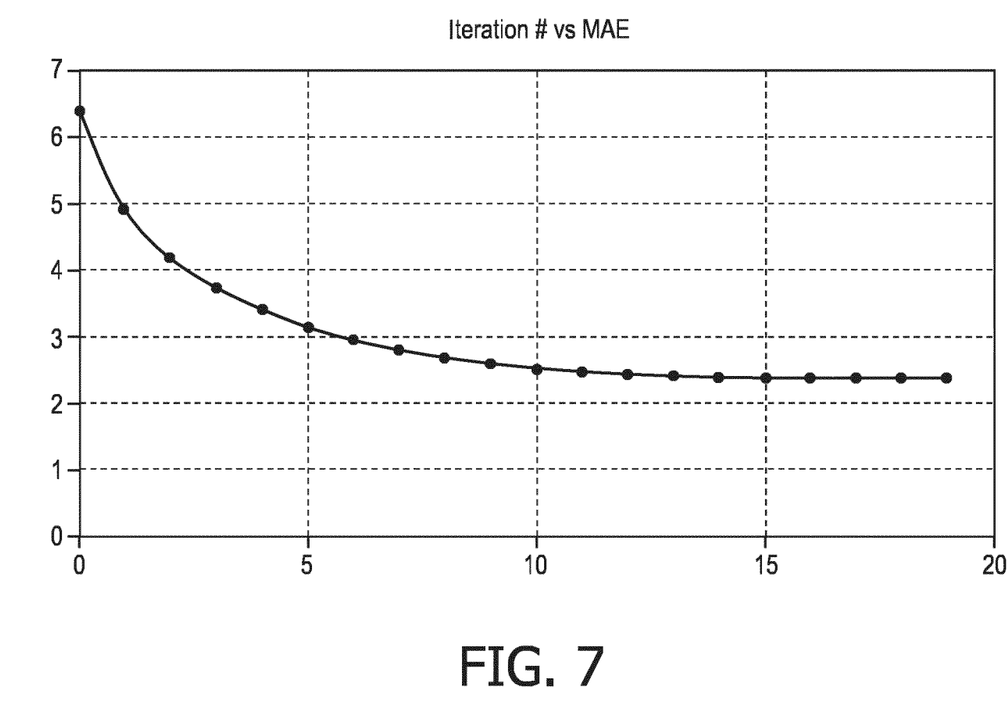

As shown in FIG. 7, the MAE process is repeated using the image reconstructed with the locally modified TOF kernels as the prior for the next iteration. FIG. 7 shows that, as iteration number increases, the MAE reduces rapidly. The final stable MAE is about the same as when the timing resolution is about 150 ps (but with only one iteration).

Figure 8:
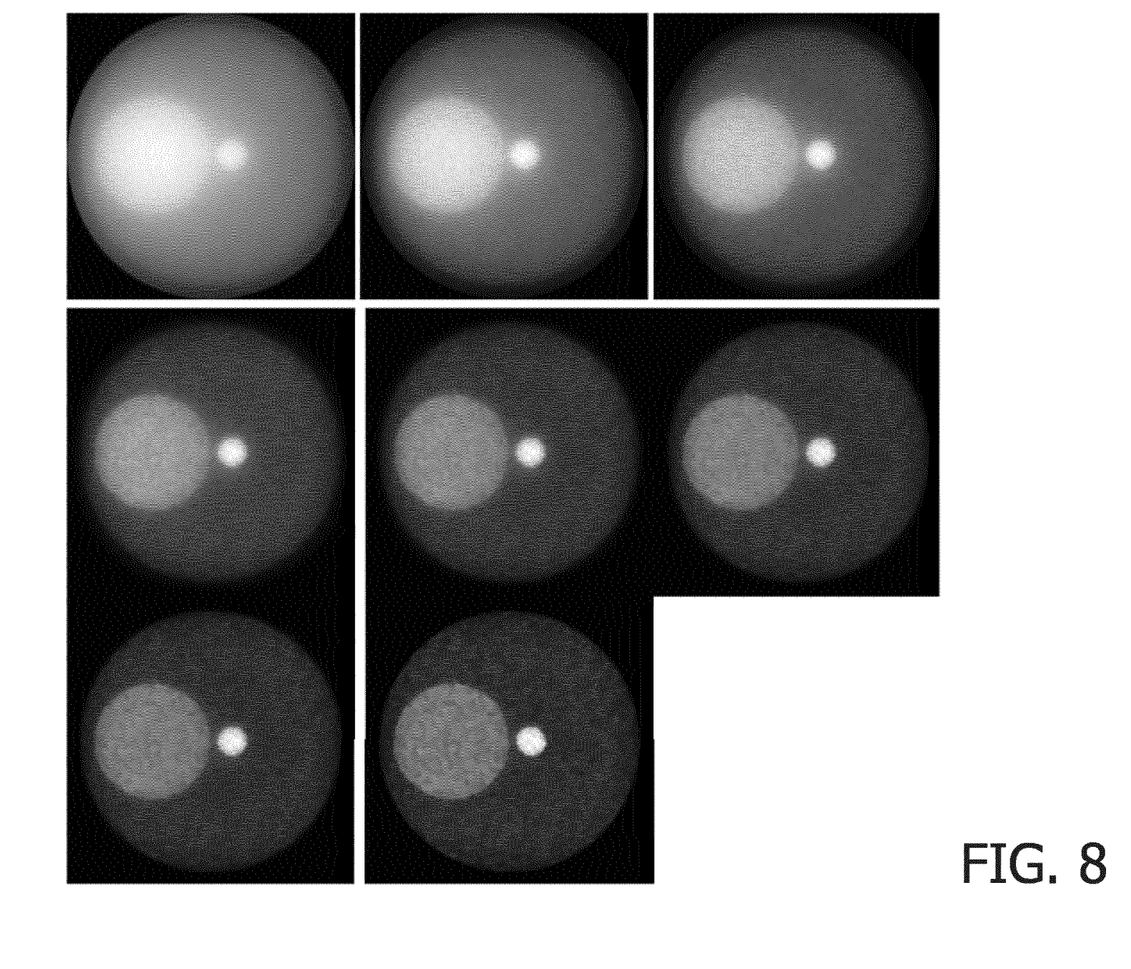

FIG. 8 shows the reconstructed images as the iteration number increases (at 600 ps). As shown in FIG. 8, (from top to bottom, left to right), the iteration numbers are 0 (same as the back projection using the standard TOF kernel), 1, 2, 4, 6, 8, 10, 19. It is apparent that the image quality improves. The image quality is further assessed by comparing the middle row values of the reconstructed images to those of the phantom (ideal) image (shown in FIGS. 9 and 10).

Figure 9:
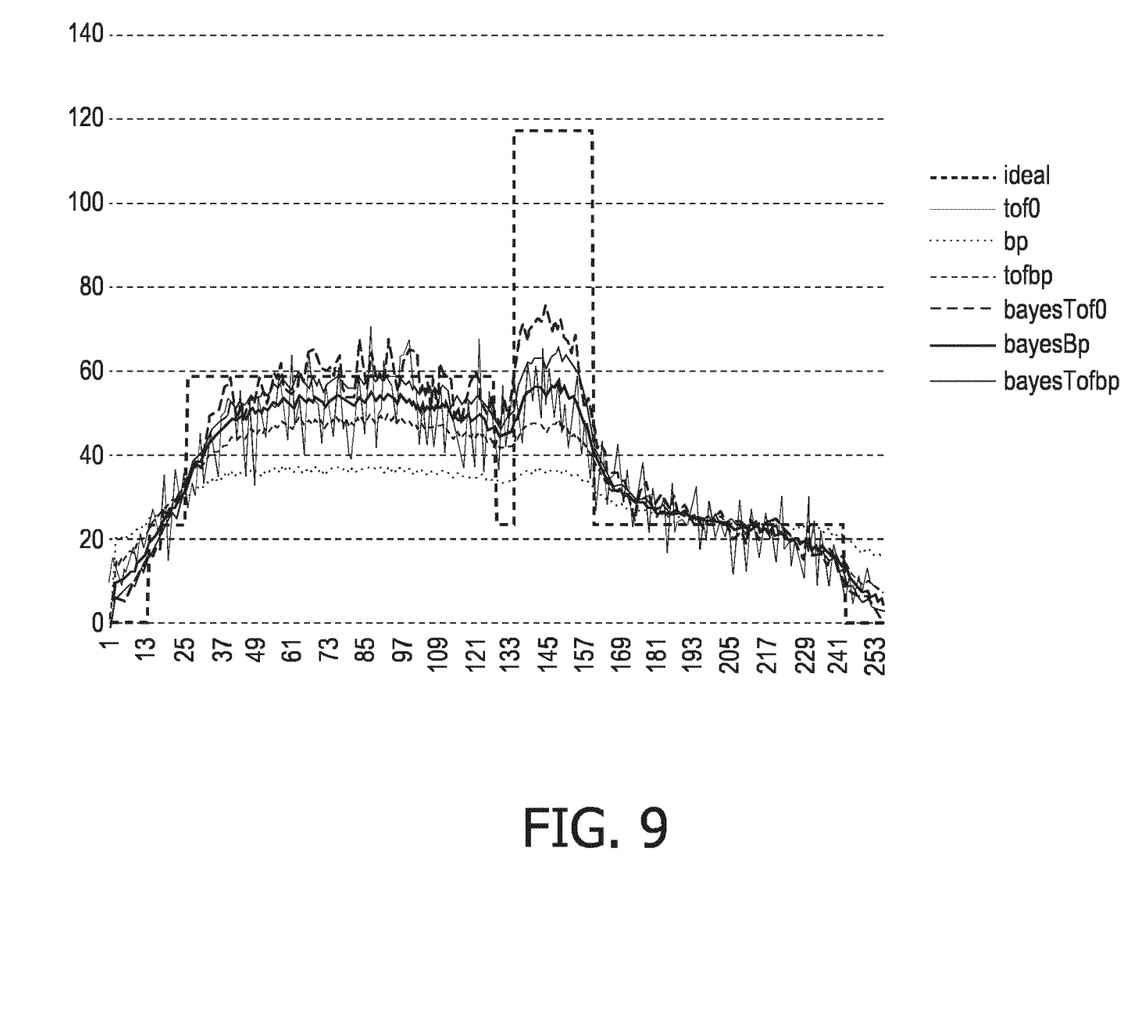

FIG. 9 shows the profiles of the middle rows through the images reconstructed using various kernels and algorithms. As shown in FIG. 9, this plot corresponds to the images shown in FIG. 5.

Figure 10:
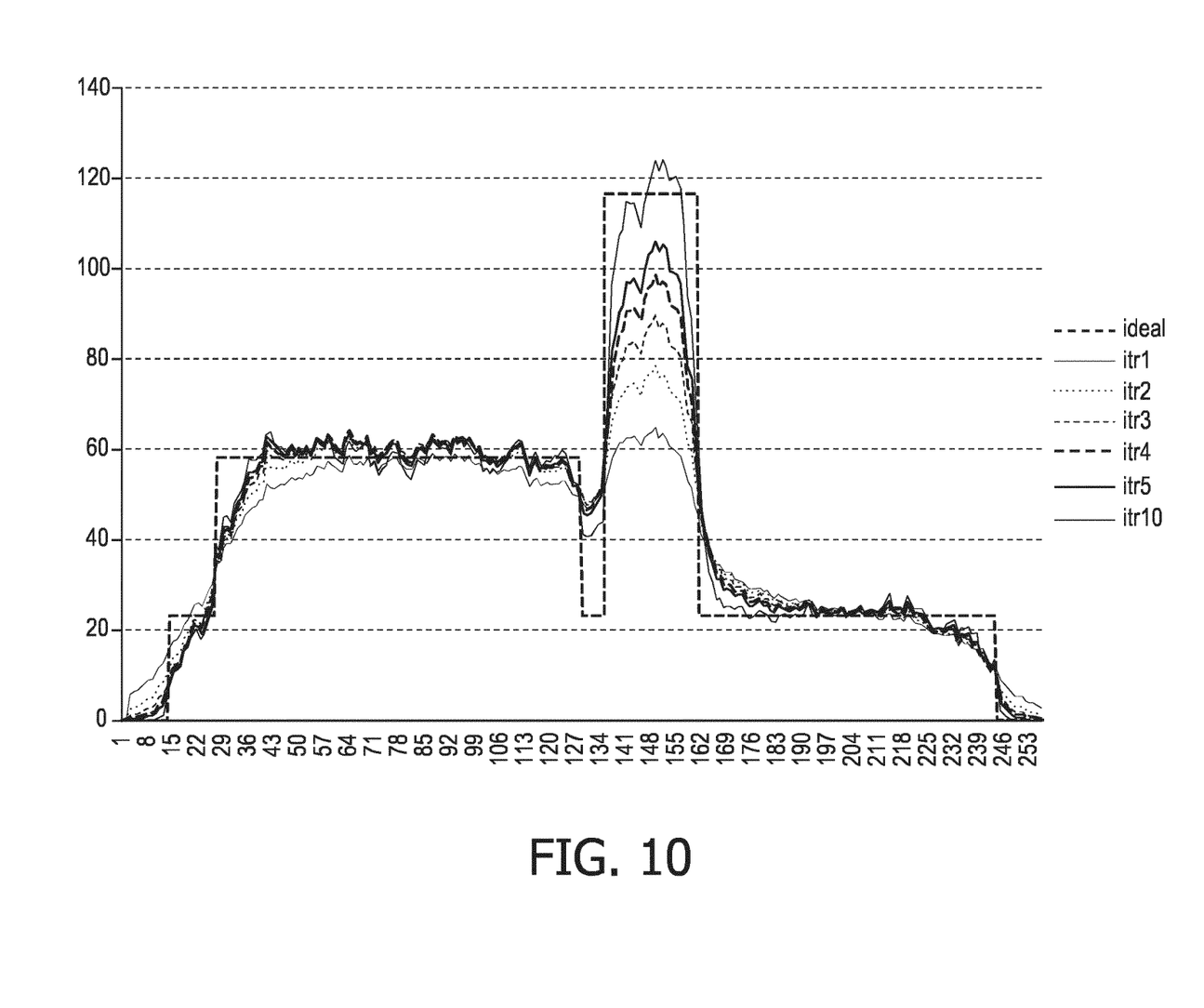

FIG. 10 shows that, as the iteration number increases, the profiles along the middle line through the image are getting closer to the ground truth.

Referring back to FIG. 2, the PET scanner 10 can include components known in the art of image generation systems. In one example, the PET scanner 10, the computer 22, the reconstruction processor 30, and the display 34 each include a memory. As used herein, a memory includes one or more of a non-transitory computer readable medium; a magnetic disk or other magnetic storage medium; an optical disk or other optical storage medium; a random access memory (RAM), read-only memory (ROM), or other electronic memory device or chip or set of operatively interconnected chips. As used herein, the PET scanner 10 can include a communication network (not shown) that includes an Internet/Intranet server from which the stored instructions may be retrieved via the Internet/Intranet or a local area network; or so forth. Further, as used herein, the reconstruction processor 30 includes one or more of a microprocessor, a microcontroller, a graphic processing unit (GPU), an application-specific integrated circuit (ASIC), a field-programmable gate array (FPGA), and the like. In a further example, the computer 22 can include a user input device that includes one or more of a mouse, a keyboard, a touch screen display, one or more buttons, one or more switches, one or more toggles, and the like. In another example, the computer 22 can include databases with one or more memories. In a further example, the PET scanner 10 can be in communication with a radiology information system (RIS) and/or picture archiving and communication system (PACS) which stores the images. In a further example, the display includes one or more of an LCD display, an LED display, a plasma display, a projection display, a touch screen display, and the like, including 3D-capable versions of these. In a further example, the display 34, the reconstruction processor 30, the computer 22, and the PET scanner 10 each include a communication unit and/or at least one system bus. The communication unit provides a corresponding processor with an interface to at least one communication network, such as a wireless network. The system bus allows the exchange of data between subcomponents of the components. Subcomponents include processors, memories, sensors, display devices, communication units, and so on. In addition, the reconstruction processor 30 can comprise one or multiple processors.

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An imaging device comprising:
    a positron emission tomography (PET) scanner including radiation detectors and coincidence circuitry for detecting electron-positron annihilation events as 511 keV gamma ray pairs defining lines of response (LORs) with each event having a detection time difference $\Delta t$ between the 511 keV gamma rays of the pair;
    at least one processor programmed to reconstruct a dataset comprising detected electron-positron annihilation events acquired for a region of interest by the PET scanner to form a reconstructed PET image wherein the reconstruction includes TOF localization of the events along respective LORs using a TOF kernel having a location parameter dependent on $\Delta t$ and a TOF kernel width or shape that varies over the region of interest; and
    a display device configured to display the reconstructed PET image.

2. The imaging device according to claim 1, wherein the TOF kernel is a Gaussian distribution.

3. The imaging device according to claim 1, wherein the at least one processor is programmed to compute the spatial variation of the width or shape of the TOF kernel over the region of interest using at least one input image.

4. The imaging device according to claim 3, wherein the at least one processor is programmed to compute the spatial variation of the width or shape of the TOF kernel by:
  adjusting the shape of the TOF kernel of each LOR by multiplying the TOF kernel of the LOR by the portion of at least one input image overlapping the TOF kernel.

5. The imaging device according to claim 3, wherein the at least one processor is further programmed to:
  re-normalize the TOF kernels with the adjusted width or shape.

6. The imaging device according to claim 3, wherein the reconstruction is an iterative reconstruction and the adjusting is performed for an iteration of the iterative reconstruction using a reconstructed image from a previous iteration as the at least one input image.

7. The imaging device according to claim 3, wherein the at least one processor is programmed to compute the shape of the TOF kernel for a LOR j as proportional to $H_{ij}^{mTOF} = H_{ij}^{TOF} \cdot f_i$, where $H_{ij}^{TOF}$ is the value of a standard TOF kernel at location i along LOR j and $f_i$ is the value of the at least one input image at the location i.

8. The imaging device according to claim 3, wherein the at least one processor is programmed to compute the shape of the TOF kernel for a LOR j as proportional to $H_{ij}^{mTOF} = H_{ij}^{TOF} \cdot (1-b) + H_{ij}^{TOF} \cdot f_i \cdot b$ where $H_{ij}^{TOF}$ is the value of a default TOF kernel at location i along LOR j, $f_i$ is the value of the at least one input image at the location i, and b is a an adjustment relaxation parameter, wherein $0 < b \le 1$.

9. The imaging device according to claim 3, wherein the at least one processor is further programmed to:
  convert the list-mode events into sinograms before the image reconstruction by grouping directionally alike events and averaging the grouped events into a sinogram bins.

10. The imaging device according to claim 3, wherein the at least one input image is an image of the region of interest generated by an additional modality other than PET.

11. A non-transitory computer readable medium carrying software to control at least one processor to perform an image acquisition method, the method including:
  acquiring, from a positron emission tomography (PET) scanner including radiation detectors, PET emission imaging data, the PET emission imaging data including electron-positron annihilation events as 511 keV gamma ray pairs defining lines of response (LORs) with each event having a detection time difference $\Delta t$ between the 511 keV gamma rays of the pair;
  generating, with at least one processor, a spatially variant TOF kernel by multiplying a standard TOF kernel by at least one input image;
  reconstructing, with the at least one processor, the PET imaging data to generate a reconstructed image using the spatially variant TOF kernel; and
  displaying, with a display device, the reconstructed image.

12. The non-transitory computer readable medium according to claim 11, wherein the adjusting further includes normalizing the TOF kernel multiplied by the at least one input image.

13. The non-transitory computer readable medium according to claim 11, wherein the reconstruction is an iterative reconstruction and the adjusting is performed for successive iterations of the iterative reconstruction using a reconstructed image from a previous iteration as the at least one input image.

14. The non-transitory computer readable medium according to claim 11, wherein the at least one processor is programmed to compute the shape of the TOF kernel for a LOR j as proportional to $H_{ij}^{mTOF} = H_{ij}^{TOF} \cdot f_i$, where $H_{ij}^{TOF}$ is the value of a standard TOF kernel at location i along LOR j and $f_i$ is the value of the at least one input image at the location i.

15. The non-transitory computer readable medium according to claim 11, wherein the at least one processor is programmed to compute the shape of the TOF kernel for a LOR j as proportional to $H_{ij}^{mTOF} = H_{ij}^{TOF} \cdot (1-b) + H_{ij}^{TOF} \cdot f_i \cdot b$ where $H_{ij}^{TOF}$ is the value of a default TOF kernel at location i along LOR j, $f_i$ is the value of the at least one input image at the location i, and b is a an adjustment relaxation parameter, wherein $0 < b \le 1$.

16. The non-transitory computer readable medium according to claim 11, wherein the at least one processor is further programmed to:
  convert the list-mode events into sinograms before the image reconstruction by grouping directionally alike events and averaging the grouped events into a sinogram bins.

17. The non-transitory computer readable medium according to claim 12, wherein the at least one input image is an image of the region of interest generated by computed tomography (CT), magnetic resonance (MR) imaging, or ultrasound (US) imaging.

18. The non-transitory computer readable medium according to claim 12, wherein the input image is further generated from at least one of: a previously-generated reconstructed image, a fast algorithm, an analytical algorithm, an iterative algorithm, an image created from a list of events as if a timing resolution of the imaging scanner is zero; an image created from previous studies; and a simulated nuclear image generated from a computed tomography image.

19. An imaging device comprising:
  a positron emission tomography (PET) scanner including radiation detectors and coincidence circuitry for detecting electron-positron annihilation events as 511 keV gamma ray pairs defining lines of response (LORs) with each event having a detection time difference $\Delta t$ between the 511 keV gamma rays of the pair;
  at least one processor programmed to reconstruct a dataset comprising LORs acquired for a region of interest by the PET scanner to form a reconstructed PET image wherein the reconstruction includes TOF localization of the event using a TOF kernel having a location parameter dependent on $\Delta t$ and a width parameter that varies with time of acquisition of the event; and
  a display device configured to display the reconstructed PET image.

20. The imaging device of claim 19, wherein the width parameter of the TOF kernel varies with a temperature change of the radiation detectors over time.

* * * * *